Aug. 29, 1967 G. E. SWANSON 3,338,449
BOX CONSTRUCTION
Filed Jan. 8, 1965 2 Sheets-Sheet 1
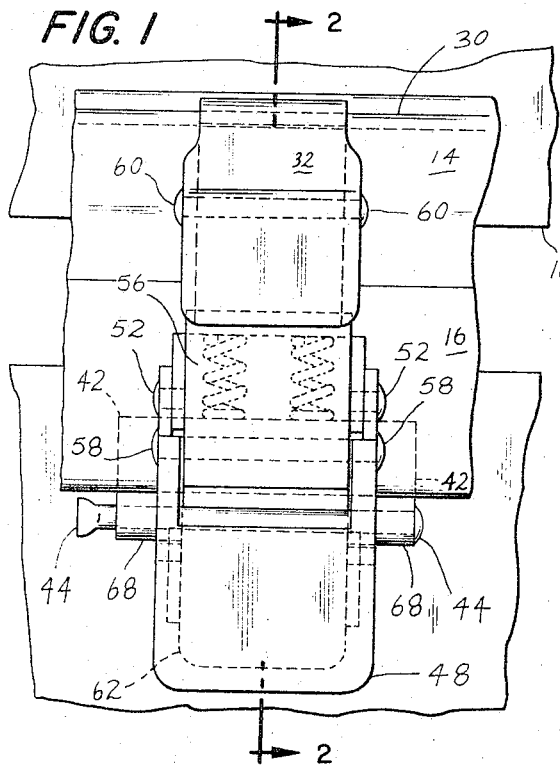
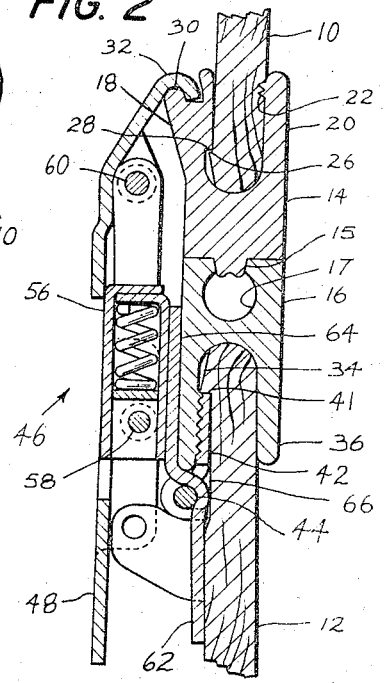
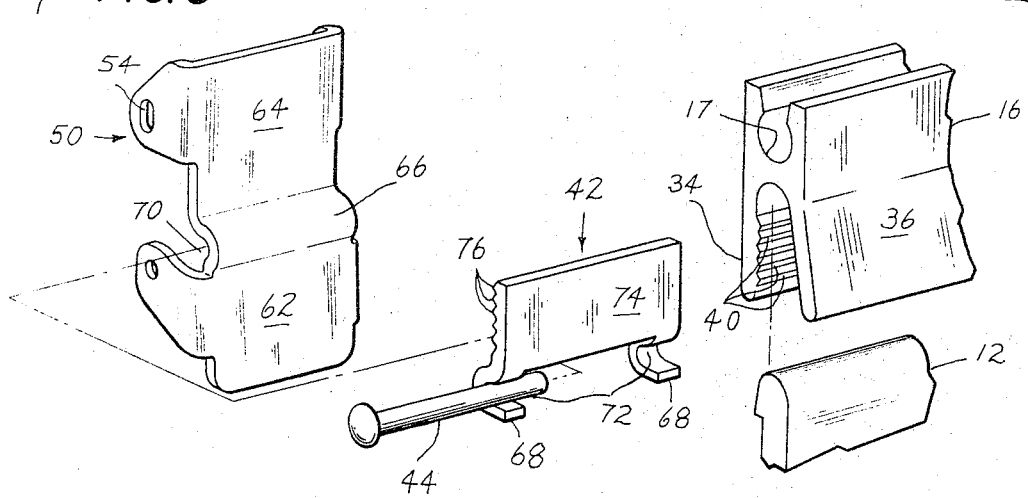
INVENTOR.
GUNNAR E. SWANSON
BY
McCormick, Paulding & Huber
ATTORNEYS

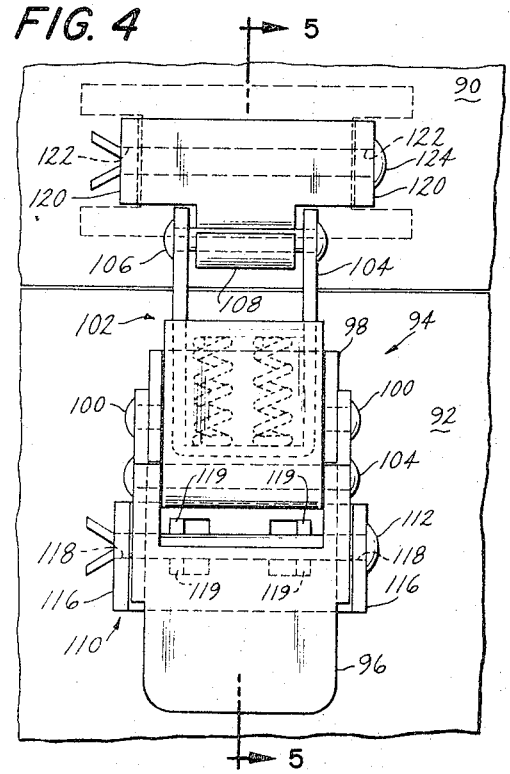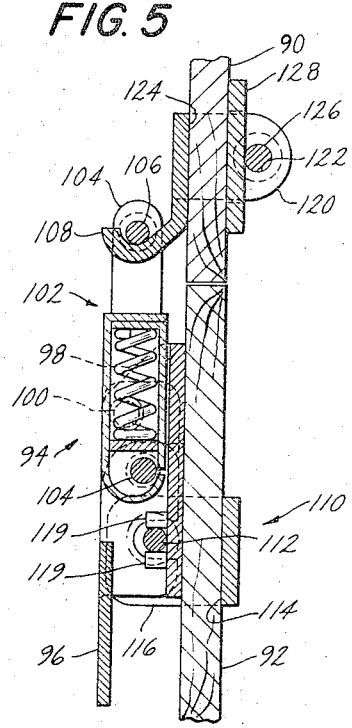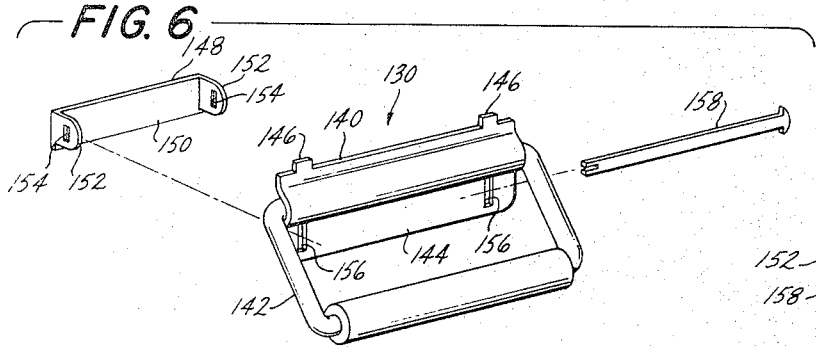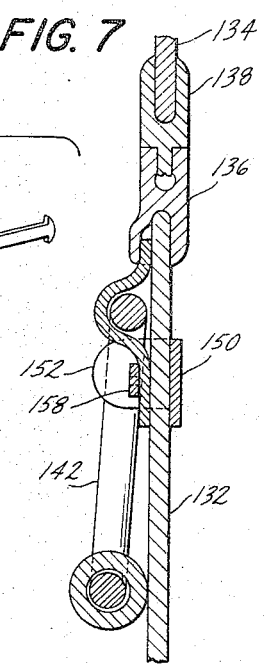

United States Patent Office 3,338,449
Patented Aug. 29, 1967

3,338,449
BOX CONSTRUCTION
Gunnar E. Swanson, Middletown, Conn., assignor to The Nielsen Hardware Corporation, Hartford, Conn., a corporation of Connecticut
Filed Jan. 8, 1965, Ser. No. 424,820
5 Claims. (Cl. 217—56)

This invention relates generally to the construction of packing boxes and the like and to devices for attaching articles to the generally flat outer surface of a box panel or the like. More particularly, the invention deals with a novel attachment means for securing a catch, or a handle, to the generally flat outer surface of a packing case or box.

A general object of the present invention is to provide means for attaching an article to the flat outer surface of a panel or the like, which means will permit the article to be readily removed from the panel for replacement, repair or salvage.

Another general object of the invention is to provide a box construction in which an extruded edging attached to the edges of the box panel to provide mating surfaces also serves as part of a means for holding an article such as a catch to the box or as a strike for a catch.

Another specific object of this invention is to provide a means for attaching a catch to one of two separable panels, which means is especially adapted for use with a low profile catch so that the resulting assembly protrudes only a small distance from the surface of said panel.

Another specific object of this invention is to provide a means for attaching an article to a relatively flat surface, which means is cooperatively associated with an edge member extending along the edge of said panel so that said means does not require screws or other fastening means for attachment to said panel.

Other objects and advantages of the invention will be apparent from the following description and from the drawings forming a part thereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a front elevational view of a catch for securing two separable panels in edge abutting relationship and shows a body of said catch removably secured to one of said panels by attachment means of the present invention;

FIG. 2 is a sectional view taken along line 2—2 of FIG. 1;

FIG. 3 is a disassembled perspective view of the catch body shown in FIG. 1 with a pin and an attachment member of the present invention, an edge member for the panel being shown also;

FIG. 4 is a front elevational view of an alternative embodiment of a catch body attachment means constructed in accordance with the present invention;

FIG. 5 is a sectional view taken along the line 5—5 of FIG. 4;

FIG. 6 is a disassembled perspective view of a packing case handle together with a pin and an attachment member of the present invention;

FIG. 7 is a vertical cross sectional view through the handle shown in FIG. 6 and shows the handle attached to a packing case panel having an edge member along one edge thereof.

Turning now to the drawings in greater detail, and more particularly to FIGS. 1 through 3, a portion of a packing case or the like is illustrated by upper and lower panels 10 and 12, respectively. The panels 10 and 12 are intended to represent the cover and main body of the packing case and the mating edges thereof are fitted with extruded aluminum edge members 14 and 16, respectively.

As best shown in FIG. 2, the edge members 14 and 16 have mating edge surfaces which are co-engageable so as to seal the packing case. As shown, the edge member 16 includes a generally cylindrical opening 17 extending longitudinally therealong and communicating with the upper edge surface through a longitudinally extending slot. A resilient sealing member or gasket (not shown) may be placed in this opening to assure a more positive seal between the panels 10 and 12, if desired. The lower edge of the upper edge member 14 includes a depending rib 15 which extends along the length of said edge member and which protrudes into the cylindrical opening 17 and slot in the lower edge member 16, when the panels are positioned as in FIGS. 1 and 2, to prevent movement of the panels with respect to one another and to compress any seal member which may be provided in the opening 17.

The upper edge member 14 is generally U-shaped in cross section, having outer and inner legs or flanges 18 and 20, respectively. The outer flange 18 includes a downwardly facing shoulder 26 which engages an upwardly facing shoulder 28 on the panel 10 to aid in retaining the edge member 14 on the panel 10. The inner flange 20 includes a plurality of teethlike longitudinal ribs 22, 22 adjacent its upper end which are pressed into the material of the panel 10 to further aid in retaining the edge member on the panel. FIG. 2 shows the edge member 14 in its final or assembled condition with the panel 10. Before assembly, the two flanges 18 and 20 are spread to receive the panel 10 and then, after the panel is placed between the flanges, the flanges are pressed into the final panel-gripping position shown in FIG. 2. The outer flange 18 is further shaped so as to define a strike 30 which is engageable by a hook of a catch as described hereinbelow.

The lower edge member 16 is also generally U-shaped in cross section with outer and inner flanges 34 and 36, respectively, which are initially spread and then pressed into clamping engagement with the panel 12 in the same manner as the flanges 18 and 20 on the member 14. The outer flange 34 includes a plurality of teethlike longitudinal ribs 40, 40 (best shown in FIG. 3) which are adapted to grip either the panel 12 or the attachment member described below. To aid in holding the edge member to the panel, the panel preferably includes a downwardly facing shoulder 41 which is engaged by the upper surface of the upper rib 40 at points along the length of the panel other than those points covered by the attachment member.

In accordance with the present invention, an article of packing case hardware such as a catch or handle or the like, is secured to the flat panel 12 by attachment means such as shown best in FIG. 3. In the construction there shown, the attachment means comprises an attachment member 42 and an elongated pin 44 adapted to be received in a socket defined at least in part by the member 42. In the illustrated case, the article of hardware to be secured to the panel 12 comprises a catch shown in detail at 46 in FIGS. 1 and 2.

The illustrated packing case catch 46 comprises an operating lever 48 which is pivotally connected to a base 50 by transverse aligned pivot pins 52, 52. These pins are received in aligned openings in the operating lever 48 and elongated aligned openings 54, 54 shown in FIG. 3, in the base 50. A link 56 is pivotally connected to the operating lever 48 by a transverse pivot pin 58. The link 56 includes relatively sliding parts which are spring-biased into retracted relationship with one another. At the upper end of the link 56, one part is pivotally connected with a hook member 32 by a transverse pivot pin 60, the other part being pivotally connected to the operating lever by the pin 58, as mentioned. The relationship of the parts is such that when the catch is closed, as in FIGS. 1 and 2, the two parts of the link 56 are displaced against the force of the springs so that a spring force is applied between the two panels to resiliently hold the panels in their closed condition. The exact structure of the catch may, however, vary widely without departing from the invention and it will be understood that the catch 46 has been shown by way of example only.

The catch base 50 includes a lower portion 62 which engages the panel 12 and which is flat and stepped inwardly with respect to an upper portion 64. The upper portion 64 of the catch body 50 flatly engages the outside surface of the outer flange member 34 of the lower edge member 16, as best shown in FIG. 2, and between the upper and lower portions 62 and 64 is an intermediate wall portion 66 of the catch base 50 which on one side engages the lower end of the flange 34 and which on its other side cooperates with laterally spaced lower portions or fingers 68, 68 of the attachment member 42 and below and continuous with the wall portion 66 includes a forwardly facing surface 70 curved about a transverse axis. This surface 70 cooperates with the rearwardly facing surfaces 72, 72 on the fingers 68, 68 and with the pin 44 to hold the base against movement away from the panel in a direction normal to the panel, the surface 70 engaging one side of the pin and the surfaces 72, 72 engaging the opposite side of the pin. Movement of the base vertically relative to the panel is prevented by the engagement of the intermediate wall 66 with the pin 44 and with the lower end of the flange 34, and movement of the base laterally is prevented by engagement of the fingers 68, 68 with the adjacent sides of the base. The base is therefore completely locked in place by the single pin 44 and by merely removing this pin the base and the remainder of the catch may be quickly removed from the panel. Likewise, when assembling the catch with the panel, the single step of inserting the pin quickly secures the catch to the panel.

The attachment member 42 has a generally flat upper portion 74 which fits behind the outer flange 34 of the edge member 16. The rear surface of said upper portion is flat and engages the panel 12 while the front surface thereof includes a plurality of ribs 76, 76 which mate with the ribs 40, 40 on the flange 34. The upper portion 74 is placed between the flange 34 and the panel 12 before the flanges are pressed together and may be readily located at any point along the edge member. As the flanges 34 and 36 are pressed together to assemble the edge member to the member 42 so as to thereafter pass from the surface of the panel, the flange 34 is pressed inwardly adjacent the two side edges of the member 42 so as to thereafter pass from the surface of the panel, over the outer surface 76 of the clip member and back to the surface of its panel thereby locking the attachment member in place against movement longitudinally of the edge member, the coengagement of the flange ribs 40, 40 with the ribs 76, 76 restraining the attachment members against movement transversely of the edge member.

Turning now to the alternative attachment means shown in FIGS. 4 and 5, portions of a packing case, box, or the like are indicated by upper and lower panels, 90 and 92 respectively. The panels 90 and 92 are intended to represent the cover and main body of a packing case, and their respective edges may be fitted with mating edge members as described above, or be squared off as shown in FIG. 5.

The packing case catch, indicated generally at 94, is or may be of conventional construction and comprises an operating lever 96 which is pivotally connected to a base 98 by transverse pivot pins 100, 100 which are aligned with one another as shown. A spring link member 102 is pivotally connected to the operating lever 96 by a transverse pivot pin 104 and at its upper end carries a transverse pin 106 for engaging a strike 108 attached to the upper panel 90 as shown. In FIG. 5 the catch 94 is shown in its closed condition.

The catch 94, like the catch 46 shown in FIGS. 1 to 3, may comprise any one of a variety of forms but, preferably and as shown, the base 98 has a generally flat inner or rear surface adapted to engage the front face of the lower panel 92. An outer, or front surface, of the catch base 98 cooperates with a U-shaped attachment member 110 and with a pin 112 to hold the base in assembled relationship with the panel 92. The attachment member 110 has a flat portion 114 which engages the rear, or inner face, of the panel 92 behind the catch 94, as best shown in FIG. 5. Extending forwardly from the ends of the flat portion 114, the attachment member 110 has two ears 116, 116 which pass through rectangular openings provided therefor in the panel 92. Each of these ears 116, 116 includes a cylindrical opening 118 which is so located that the elongated cylindrical pin 112 when entered in the two openings 118, 118 as shown in FIG. 5, will be located close to or in engagement with the front surface of the base. As so arranged, the engagement of the pin 112 with the front surface of the catch body and with the rearwardly facing portions of the surfaces defining the openings 118, 118 holds these parts against movement of the base away from the panel. Movement of the base vertically relative to the panel in FIGS. 4 and 5 is prevented by suitable stop means such as two pairs of fingers 119, 119 which are struck up from the base and which engage opposite sides of the pin 112. Lateral movement of the base is prevented by engagement of the ears 116, 116 with the adjacent sides of the base, the base being received between the ears.

Still with reference to FIGS. 4 and 5, the strike 108 is attached to the panel 90 in much the same manner as that in which the attachment member 110 is attached to the panel 92. The strike is made as a generally U-shaped part having rearwardly extending ears 120, 120 which are received in rectangular openings in the upper panel or cover 90. Each ear 120 has a cylindrical opening 122 therein which is spaced from the flat panel engaging portion 124 of the strike by such an amount that an elongated pin 126 can be entered in the aligned openings 122, 122 to hold the strike against the panel 90 as shown in FIG. 5. A flat pin engaging plate 128 is provided between the pin and the panel and serves the same function as the flat rear wall of the catch base 98 with respect to the pin 112.

Turning now to the embodiment illustrated in FIG. 6 and 7, an attachment means is there shown for securing a packing case handle 130 to a panel 132. As shown, the panel 132 is intended to represent the body portion of a packing case and an upper panel 134 represents the cover portion. The panels 132 and 134 are fitted with U-shaped mating edge members 136 and 138 respectively, which define mating edge surfaces generally similar to those shown and described with reference to FIGS. 1 and 2.

The handle 130 comprises a base 140 which pivotally receives a bail 142. A lower portion 144 of the base 140 defines a flat rearwardly facing surface for engaging the flat outer surface of the panel 132. Suitable means are defined adjacent the upper edge of the base 140 for mating with the edge member 136. In the form shown, this means comprises two laterally spaced tabs 146, 146 which are received under the edge member 136 as shown in FIG. 7.

For attaching the handle to the panel 132, there is provided an attachment member 148 having a flat body portion 150 and two ears 152, 152 which project forwardly from either end of the body portion 150. Each of the ears 152, 152 is provided with a rectangular aperture 154. In assembly with the panel 134 and handle 130, the attachment member 148 is arranged with its body portion 150 located on the inner surface of the panel 132 and with the ears 152, 152 projecting through conforming openings in the panel 132 and similar conforming openings 156, 156 in the lower portion 144 of the handle body 140. The openings 154, 154 are so located that when the attachment member 148 is properly assembled with the panel 132 and handle body 140, a rectangular pin 158 may be inserted through the openings and be located adjacent the outer surface of the lower portion 144. The pin 158 is provided with a head at one end and at the other end has two bifurcations which may be spread after assembly to lock the pin in place. After this assembly of the pin 158 with the openings in the clip ears 152, 152, the engagement of the forward surface of the lower body portion 144 and the engagement of the rearwardly facing surface of the openings 154, 154 with the pin 158 prevent the handle base 140 from moving away from the panel 132. Engagement of the walls of the openings 156, 156 with the ears 152, 152 further restrains the handle base against vertical and lateral movement relative to the panel.

The invention claimed is:

1. Attachment means for securing an article having a flat base to the generally flat outer surface of a panel adjacent one edge thereof, said means comprising an attachment member having a generally flat upper portion and a lower portion with two laterally spaced fingers each of which is curved about a transverse axis into a U-shape to define a curved rearwardly facing surface, said two fingers being located on opposite sides of said base, an elongated edge member for said panel which is of generally U-shaped cross section to define two flanges which receive the edge portion of said panel, said attachment member having its upper portion received between the outer one of said two flanges and said panel so as to be fixed to said panel by said flange, and an elongated pin received between said curved rearwardly facing surfaces of said attachment member fingers and the forward surface of said base to hold said base to said panel.

2. Attachment means as set forth in claim 1 wherein said attachment member includes a plurality of ribs on the front surface of said upper portion thereof, and said outer flange of said edge member includes a plurality of ribs on the inner surface thereof which mate with said ribs of said attachment member.

3. In a packing box having two panels with opposed edges the combination comprising a first edge member extending along the length of the first of said panel edges and including inner and outer flanges between which said first panel is received, a second edge member extending along the length of the second of said panel edges and including inner and outer flanges between which said second panel is received, an attachment member having a portion extending between the outer flange of said second edge member and said second panel and having two laterally spaced fingers each of which is curved about a transverse axis to define a curved rearwardly facing surface, a catch having a base located between said two spaced fingers and having sides engageable with said fingers to prevent lateral movement of said base relative to said panel, said base including a portion engaging the surface of said second panel and a transverse wall portion engaging the edge of said outer flange of said second edge member, the forwardly facing surface of said panel engaging portion of said base being located behind said rearwardly facing curved surfaces of said fingers, an elongated pin received between said curved surfaces of said fingers and said forwardly facing surface of said panel engaging portion of said base and located on the opposite side of said transverse wall from said edge of said outer flange of said second edge member, means on said outer flange of said first edge member providing a strike extending the length of said first edge member, and a hook member on said catch engageable with said strike to hold said two panels in joined relationship.

4. The combination defined in claim 3 wherein said first and second edge members are extrusions.

5. Attachment means for securing an article having a base with a rearwardly facing surface and an oppositely directed forwardly facing surface to the outer surface of a panel, said means comprising an edge member fastened to one edge of said panel and including an outer flange overlying a part of said outer surface of said panel, an attachment member having a first portion received between said outer surface of said panel and said outer flange of said edge member, said attachment member also including two laterally spaced fingers extending beyond said outer flnage of said edge member and each of which fingers is curved about a transverse axis to define a curved rearwardly facing surface located forwardly of said forwardly facing surface of said base, said two fingers being located on opposite sides of said base and being engageable with said base sides to prevent lateral movement of said base relative to said panel, coengaging means on said outer flange of said edge member and on said one portion of said attachment member for restraining said attachment member against movement in a direct parallel to said panel and normal to said one edge thereof, and an elongated pin received between said curved rearwardly facing surfaces of said attachment member fingers and said forwardly facing surface of said base to prevent movement of said base relative to said panel in a direction normal to said panel, said base having a wall portion located between said flange and said pin so that engagement of said wall portion with said flange and with said pin restrains said base against movement in a direction parallel to said panel and normal to said one edge thereof.

References Cited

UNITED STATES PATENTS

| | | | |
|---|---|---|---|
| 694,275 | 2/1902 | Herz | 229—49 |
| 928,619 | 7/1909 | Wood | 190—58 |
| 1,041,170 | 10/1912 | Ross | 16—126 |
| 1,958,776 | 5/1934 | Woolsey et al. | 217—19 |
| 2,743,029 | 4/1956 | Mautner | 217—56 |
| 3,044,658 | 7/1962 | Combs et al. | 217—69 |
| 3,088,623 | 4/1963 | Parker | 220—94 |

THERON E. CONDON, *Primary Examiner.*

RAPHAEL H. SCHWARTZ, *Examiner.*

UNITED STATES PATENT OFFICE
CERTIFICATE OF CORRECTION

Patent No. 3,338,449                            August 29, 1967

Gunnar E. Swanson

It is hereby certified that error appears in the above numbered patent requiring correction and that the said Letters Patent should read as corrected below.

In the heading to the printed specification, line 6, for "Ser. No. 424,820" read -- Ser. No. 424,280 --; column 3, line 57, strike out "member 42 so as to thereafter pass from the surface of the"; line 58, for "fiange" read -- flange --; column 4, line 51, for "ehe" read -- the --; column 6, line 36, for "direct" read -- direction --.

Signed and sealed this 24th day of September 1968.

(SEAL)
Attest:

Edward M. Fletcher, Jr.                          EDWARD J. BRENNER
Attesting Officer                                   Commissioner of Patents